United States Patent
Hindman et al.

(10) Patent No.: US 11,414,969 B2
(45) Date of Patent: Aug. 16, 2022

(54) METHOD AND SYSTEM FOR METERING PROPPANT

(71) Applicant: Hi-Crush Canada Inc., Houston, TX (US)

(72) Inventors: Jared Hindman, Fort Worth, TX (US); Roy Richmond, Cypress, TX (US)

(73) Assignee: Hi-Crush Canada Inc., Houston, TX (US)

( * ) Notice: Subject to any disclaimer, the term of this patent is extended or adjusted under 35 U.S.C. 154(b) by 39 days.

(21) Appl. No.: 16/916,662

(22) Filed: Jun. 30, 2020

(65) Prior Publication Data

US 2021/0404303 A1 Dec. 30, 2021

(51) Int. Cl.
| | |
|---|---|
| *B65G 53/46* | (2006.01) |
| *E21B 43/16* | (2006.01) |
| *E21B 21/06* | (2006.01) |
| *B65G 43/00* | (2006.01) |
| *B65G 65/42* | (2006.01) |
| *E21B 43/267* | (2006.01) |

(52) U.S. Cl.
CPC .............. *E21B 43/16* (2013.01); *B65G 43/00* (2013.01); *B65G 65/42* (2013.01); *E21B 21/06* (2013.01); *E21B 43/267* (2013.01)

(58) Field of Classification Search
CPC ............ B65B 53/4641; B65B 53/4633; B65B 2812/1625
See application file for complete search history.

(56) References Cited

U.S. PATENT DOCUMENTS

| | | | | | |
|---|---|---|---|---|---|
| 4,520,677 | A | * | 6/1985 | Macko .................. | G01F 23/288 250/435 |
| 4,528,848 | A | * | 7/1985 | Hafner .................. | G01G 11/12 110/101 CC |
| 5,253,535 | A | * | 10/1993 | McCown ................ | G01F 11/24 250/435 |
| 5,394,747 | A | * | 3/1995 | Hafner ............... | B65G 65/4818 222/77 |

(Continued)

*Primary Examiner* — Joseph A Dillon, Jr.
(74) *Attorney, Agent, or Firm* — Baker Botts L.L.P.

(57) ABSTRACT

A method and system for metering proppant discharged from a storage container is disclosed. In certain embodiments, a method may comprise loading a known amount of a first proppant type into a storage container, detecting proppant at or adjacent to a discharge outlet of the storage container via one or more sensors coupled to the storage container, operating a metering device at a predetermined speed, wherein the metering device may be coupled to the discharge outlet of the storage container, and wherein the metering device may comprise one or more pockets for receiving the first proppant type. In certain embodiments, the method may further comprise dispensing a known amount of the first proppant type from the storage container via the metering device, wherein an encoder coupled to the metering device may emit pulses during the dispensing. In certain embodiments, the method may further comprise determining an amount of the first proppant type dispensed by at least one pocket of the one or more pockets of the metering device based at least in part on the pulses and determining a relationship between the known amount of the first proppant type dispensed by each pocket and a speed of the metering device.

7 Claims, 3 Drawing Sheets

(56) References Cited

U.S. PATENT DOCUMENTS

| | | | | |
|---|---|---|---|---|
| 5,697,488 A | * | 12/1997 | Kaluza | A24C 5/323 |
| | | | | 406/68 |
| 5,725,160 A | * | 3/1998 | Harper | B65G 53/4633 |
| | | | | 406/67 |
| 9,545,616 B2 | * | 1/2017 | Colclough, Jr. | B65G 53/4633 |
| 10,975,677 B2 | * | 4/2021 | Shampine | E21B 43/267 |
| 2009/0142147 A1 | * | 6/2009 | Pope | B65G 43/08 |
| | | | | 406/52 |
| 2019/0277129 A1 | * | 9/2019 | Warren | B01F 23/50 |
| 2020/0187547 A1 | * | 6/2020 | Iwasaki | B65B 37/20 |

\* cited by examiner

METHOD AND SYSTEM FOR METERING PROPPANT

TECHNICAL FIELD

This invention relates to a method and system for metering proppant discharged from a storage container.

BACKGROUND

Large quantities of particulate material commonly referred to as "proppant" are often needed to support fracturing operations. The ability to meter the amount of proppant used to sufficiently support well operations is therefore beneficial. Currently, present methods often involve measuring the amount of proppant in a storage container, for example, a silo, based on the weight of the filled storage container using a load cell. However, load cells may be susceptible to inaccuracies due to environmental factors, such as an uneven ground or changes in ambient temperature and may also need to be recalibrated on a frequent basis. Other methods of measuring the amount of proppant in a silo include using a level sensor, which are also unreliable. Level sensors only measure a level of proppant at a single point at a given time, and therefore, may be susceptible to inaccuracies due to uneven levels of proppant. For example, as proppant is filled into a silo, a vertical cone may form about the center of the silo, and as proppant is drained from a silo, an inverted vertical cone may form about the center of the silo. Thus, a level sensor may be susceptible a high variance based on the shape of the proppant in the silo and may not provide accurate measurements.

Another issue with present systems is the need to both load proppant into storage containers while simultaneously unloading proppant for transport to blenders, mixers, or other equipment. The limited nature of load cells and level sensors cannot account for simultaneous loading and unloading of proppant, making measuring the amount of proppant being used impossible. Present methods of measuring the amount of proppant dispensed from a storage container include using belt-scale systems that measure the amount of proppant transported along a belt in real-time. However, belt-scale systems must be calibrated frequently and are often susceptible to errors in accuracy due to environmental factors such as vibrations and shock during transport. Thus, using a metering device to accurately measure the amount of proppant being discharged and utilized by fracturing operations is beneficial.

The present disclosure provides a proppant metering method and system for accurately metering proppant discharged from a storage container, while also allowing the storage container to be simultaneously filled with proppant. Additionally, the improved proppant metering method and system is adaptable for different types of proppant, and only need be calibrated once for each type of proppant. The proppant metering method and system provides increased accuracy in measurements over prior methods and systems, including load cell, level sensor, and belt-scale technology.

SUMMARY

In accordance with the above, presently disclosed embodiments are directed to a method and system for metering proppant discharged from a storage container.

In certain embodiments, a method may comprise loading a known amount of a first proppant type into a storage container, detecting proppant at or adjacent to a discharge outlet of the storage container via one or more sensors coupled to the storage container, operating a metering device at a predetermined speed, wherein the metering device may be coupled to the discharge outlet of the storage container, and wherein the metering device may comprise one or more pockets for receiving the first proppant type. In certain embodiments, the method may further comprise dispensing a known amount of the first proppant type from the storage container via the metering device, wherein an encoder coupled to the metering device may emit pulses during the dispensing. In certain embodiments, the method may further comprise determining an amount of the first proppant type dispensed by at least one pocket of the one or more pockets of the metering device based at least in part on the pulses and determining a relationship between the known amount of the first proppant type dispensed by each pocket and a speed of the metering device.

In certain embodiments, the one or more sensors may comprise three sensors that are configured to provide triple modular redundancy. In certain embodiments, the one or more sensors may be capacitive proximity sensors. In certain embodiments, the metering device may comprise at least 12 pockets for receiving the first proppant type. In certain embodiments, the encoder may emit 60 pulses per rotation of the metering device. In certain embodiments, the method may further comprise determining a relationship between a second proppant type the speed of the metering device based, at least in part, on the relationship between the amount of the first proppant type dispensed by each pocket and the speed of the metering device. In certain embodiments, the relationship between the amount of the first proppant type dispensed by each pocket and the speed of the metering device may be determined using a linear regression analysis.

In certain embodiments, a system may comprise a storage container, a metering device coupled to the storage container, wherein the metering device may comprise one or more pockets for receiving proppant, an encoder coupled to the metering device, wherein the encoder may emit one or more pulses, a control unit communicatively coupled to the metering device, wherein the control unit may determine an amount of proppant discharged by at least one pocket of the one or more pockets based, at least in part, on a number of pulses emitted from the encoder during a period of time.

In certain embodiments, the storage container may be a silo. In certain embodiments, the metering device may be coupled to a discharge outlet of the silo. In certain embodiments, the storage container may further comprise one or more sensors for detecting the presence of proppant. In certain embodiments, the one or more sensors may determine the presence of proppant based, at least in part, on triple modular redundancy. In certain embodiments, the control unit may determine a relationship between an amount of proppant discharged by at least one pocket of the one or more pockets of the metering device based, at least in part, on a speed of the metering device.

In certain embodiments, a method may comprise coupling a metering device to a storage container, wherein the metering device may comprise one or more pockets, loading the storage container with a first proppant type, calibrating the metering device for the first proppant type by dispensing a known amount of the first proppant type via the metering device at two or more speeds, wherein the calibrating may be based, at least in part, on a number of pulses emitted by the encoder over a period of time, and operating the metering device for the first proppant type based on the calibrating step.

In certain embodiments, the calibrating step may comprise dispensing a known amount of proppant via the metering device for at least three different speeds of the metering device. In certain embodiments, the calibrating step may further comprise calculating an amount of proppant dispensed per pocket based, at least in part, on the known amount of proppant dispensed by the metering device and a number of pulses emitted by the encoder. In certain embodiments, the calibrating step may further comprise determining a relationship between the amount of the first proppant type dispensed per pocket and the speed of the metering device. In certain embodiments, the method may further comprise loading the storage container with a second proppant type and calibrating the metering device for the second proppant type by adjusting the relationship between the amount of the first proppant type dispensed per pocket and the speed of the metering device. In certain embodiments, the method may further comprise, calculating a total amount dispensed of the first proppant type based, at least in part, on determining a weight per pocket dispensed by the metering device. In certain embodiments, calculating a total dispensed amount of the first proppant type may further comprise adding a residual amount of proppant associated with the time period when the metering device is slowing to a stop.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation-specific decisions must be made to achieve the developers' specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of the present disclosure. Furthermore, in no way should the following examples be read to limit, or define, the scope of the disclosure.

In hydraulic fracturing operations, a wellbore may be formed in a subterranean formation that extends below the surface. The wellbore may be drilled in a horizontal, vertical, slanted, curved, or any other direction. The wellbore may be cemented and may include a casing. In some embodiments, a perforator may be disposed in the wellbore for creating perforations in the wellbore to allow fracturing fluids to flow into the subterranean formation. Furthermore, typical well stimulation jobs may include using different well treatment fluids. Well treatment fluids called fracturing fluids are commonly used in hydraulic fracturing operations. These fracturing fluids are introduced into a wellbore at pressures sufficient to create or enhance one or more fractures within a subterranean formation. These fracturing fluids may be pumped downhole with sufficient hydraulic pressure to create fractures or microfractures in a subterranean formation. Furthermore, the fracturing fluids may include suspended solid particulate called proppant. Proppant may be placed in the created or enhanced fractures and used to hold or prop open the fractures once the pressure is reduced and the well is placed into production. Thus, having an appropriate amount of proppant available at a wellsite is essential for hydraulic fracturing operations.

As used herein, "proppant" may generally refer to sand, salt, dirt, grain, fertilizer, aggregate, ceramic proppant, or any other particulate material or solid additive (or combination of such materials) that may be used in fracturing operations to hold or prop open fractures created by hydraulic fracturing. "Proppant" as described herein may refer to naturally occurring particulate materials and/or particles that are coated with a material, such as resin, and manmade products, such as ceramics. As would be understood by one of ordinary skill in the art, other types of elements or particulates may be substituted without changing the scope of the present disclosure. Proppant may be unloaded from a dump truck or other transport vehicle and moved from the truck to another location for storage. Trucks or trailers may provide relatively flexible transportation of proppant from one location to another. For example, trucks and trailers may navigate not only paved roadways, but also unpaved roadways. Thus, trucks and trailers may be used to transport proppant to a desired destination, for example, a well site, despite difficult terrain. The storage location may comprise, for example, a barge, ship, rail car, trailer, bin, silo, surge tank, or indoor bulk storage facility. The arrangement shown herein may be particularly, but not exclusively suited for transferring the particulate material into containment structures at a height above the ground, for example, silos. Proppant or other particulate materials may be suited for storing in a stockpile for later use.

Figure 1:
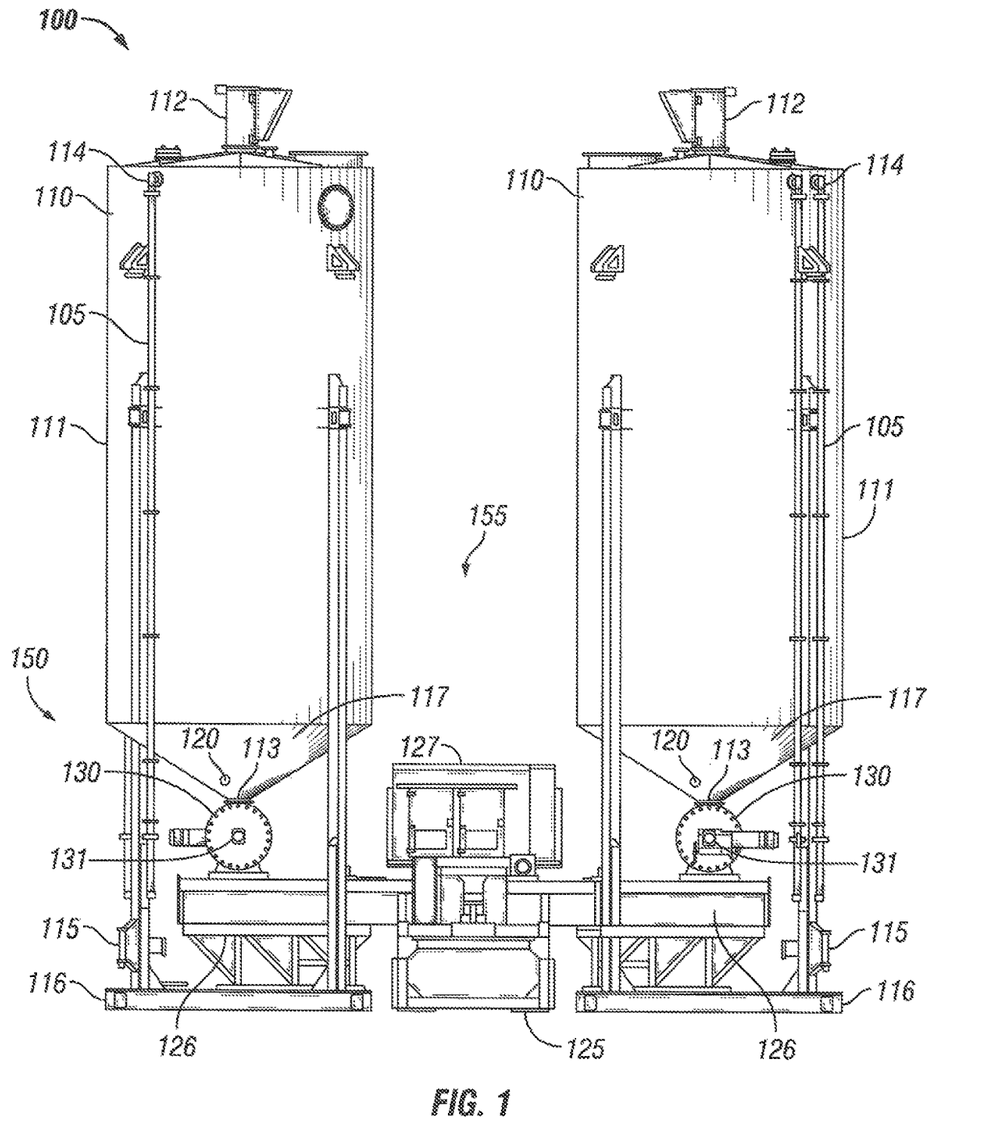
FIG. 1 depicts a proppant metering system, in accordance with aspects of the present disclosure.

FIG. 1 depicts a metering system 100 in accordance with one or more aspects of the present disclosure. A metering system 100 may be located at a job site 150 and may comprise one or more storage units for storing proppant to be used in fracturing operations, for example, one or more silos 110. Additionally, other various types of equipment and components for operations such as hydraulic fracturing operations, drilling operations, or production operations may be located adjacent to a metering system 100 or part of metering system 100 at a job site 150. For example, equipment such as power sources, piping, tubing, blenders, mixers, valves, pumps, separators, compressors, storage tanks, and other drilling and production equipment (not shown) may also be present at a job site 150 and may be part of a metering system 100. In some embodiments, some of the aforementioned equipment may be located at another area away from the one or more silos 110. For example, in some embodiments, blenders and/or mixers may be located at a job site 150 for producing the compositions or fluids needed for fracturing operations at a job site 150, and in other embodiments, compositions or fluids may be produced remote from and later delivered to a job site 150.

In certain embodiments, storage units may comprise silos 110 or other types of containers, for example, surge tanks, hoppers, or any other large container suitable for storing proppant or other particulate material. A silo 110 may be portable or fixed to a job site 150. A silo 110 may comprise a cylindrical tank 111 for storing proppant with a filler opening 112 at the top of the tank 111 and a discharge outlet 113 at or adjacent to the bottom of the tank 111. A truck or trailer (not shown) for unloading particulate at a well site into a silo may pneumatically pump the proppant vertically upwards to the filling opening 112 or an inlet 114 by connecting to piping or tubing 105 running vertically along and coupled to the tank 111 of the silo 110. In certain embodiments, a truck or trailer may be connected to a flexible hosing (not shown) which is then connected to the piping or tubing 105 coupled to the tank 111. The piping or tubing 105 may be used to transport proppant to an inlet 114 that facilitates the transport of proppant between the truck and the silo 110. An inlet 114 may aid in efficiently unloading the proppant into the silos 110, while also limiting the amount of dust emanating as a result of the transfer of proppant. In certain embodiments, the tank 111 may have a height greater than 30 to 50 feet. In certain embodiments, the tank may have a diameter less than 15 feet and (e.g., approximately 13 feet) which allows it to be portable on a flat-bed trailer as the maximum allowing road transport. A silo 110 may provide capacity to store a large amount of proppant, for example, 100,000 pounds to 1 million pounds of proppant. Proppant may be stored in a silo 110 until it is deposited into a blender or mixer (not shown) for producing one or more fracturing fluids or compositions.

Silo 110 may comprise a pressurized piping or tubing 105 for pumping proppant upwards from a transport vehicle (not shown) to the top of a silo 110. At or near the top of silo 110, proppant may be pumped through an inlet 114 or a filler opening 112 and into the silo 110. In certain embodiments, a conveyor (not shown) may be fluidically coupled to a filler opening 112 at the top of one or more silos 110 for direct transfer of proppant from the trucks to the silos 110. For example, proppant that is pumped from a transport truck through the conveyor via pressurized piping may fall or flow directly into one or more silos 110 via filler openings 112 of the one or more silos 110.

The silo 110 may further comprise a support assembly 115 for holding the tank raised from the ground such that the discharge outlet 113 is raised for discharge into a receptacle at the ground. In certain embodiments, the support assembly 115 may be configured to hold the cylindrical tank 111 of the silo 110 at a height above the ground. The support assembly 115 should support the silo at a height such that the discharge outlet 113 is high enough off the ground to fit a conveyor belt, auger, or similar device underneath to convey the material to a new location, or otherwise must be high enough to gravity feed the product to a conveyor belt, auger, similar device or container that is located adjacent to the silo. The support assembly 115 may include a base 116 for resting on the ground. In some embodiments, silos 110 may be mounted or coupled to one or more trailers (not shown) at a job site 150. Transport vehicles, for example transport vehicles 127, at a job site 150 may comprise wheels for easy transportation of equipment from location to location. Each silo 110 may be associated with a trailer, or multiple silos 110 may be associated with a given trailer. Other components, such as the conveyor for transporting proppant from the trucks to the silos 110, pressurized piping, and any other required components may also be rigged up to one or more trailers. In some embodiments, all the components of a job site 150 may be easily portable.

A proppant transport area 155 may provide for one or more transport vehicles, for example, transport vehicle 127, to transport proppant. A proppant transport area 155 of a job site 150 may be adjacent to or in close proximity to one or more storage units, for example, silos 110. In some embodiments, a proppant transport area 155 may be positioned between one or more silos 110, such that one or more silos 110 are on either or both sides of the parked transport vehicle 127, for example, as shown in FIG. 1. In other embodiments, the transport vehicle 127 may be positioned in a proppant transport area 155 such that one or more silos 110 are only on one side of the transport vehicle 127.

A transport vehicle 127 may be used to transport a conveyor 125 to a proppant transport area 155. Conveyor 125 may comprise one or more silo belts 126 disposed near or under the discharge opening or outlet 113 of a silo 110 such that proppant dispensed from the silo 110 via a metering device 130 is dropped directly on to the one or more silo belts 126. In certain embodiments the proppant may be transported through a grating (not shown) from a silo belt 126 and onto the conveyor 125. For example, silo 110 may comprise a discharge gate (not shown) underneath or at the bottom of a silo 110 covering a discharge outlet 113 of the silo 110. When the gate is closed, the discharge gate may contain proppant within the silo 110 and prevent any proppant from flowing out of the silo 110. When the discharge gate is opened, proppant may flow out of the discharge outlet 113 and into a metering device 130, onto a silo belt 126 located directly below the discharge outlet 113. As would be understood by one of ordinary skill in the art, other configurations may be appropriate where the silo belts 126 are not located directly below the discharge outlet 113 but instead may be located adjacent to the discharge opening of a silo 110.

A control unit may be further configured to control the loading of proppant into one or more silos 110. For example, upon the control unit detecting a proppant level in one or more silos 110 below a threshold (which may be input by an operator), the control unit may send a signal to one or more proppant loading vehicles (not shown) located at a job site 150 to begin pneumatically pumping proppant into the one or more silos 110. Alternatively, one or more human operators may visually inspect a proppant level in on or more silos 110 when additional proppant should be filled into one or more silos 110. For example, a first operator may visually inspect the proppant levels of one or more silos 110 at a job site 150 to determine which specific silo 110 is below a given threshold or otherwise needs additional proppant. Upon determining there is an insufficient amount of proppant in a given silo 110, a first operator may radio or contact a second operator at a job site 150 to connect a proppant loading vehicle to a given silo 110. The first operator may further radio or contact the second operator at a proppant loading vehicle and notify the second operator to cease loading proppant once the proppant in silo 110 has reached a certain threshold.

A metering device 130 may be coupled to a silo 110 near or adjacent to the discharge opening 113 of the silo 110. Metering device 130 may be further communicatively coupled to a control unit (now shown). In certain embodiments, a metering device 130 may be a rotary air lock device that measures proppant based on a number of rotations of the metering device 130 over a given amount of time. For example, a metering device 130 may comprise one or more pockets (not shown), where each pocket may fill with proppant as the metering device 130 rotates. A metering device 130 may have any suitable number of pockets, for example, 4, 8, 12, or 16 pockets. It may be determined based on the number of rotations per period time, for example, the number of rotations per minute, and the number of pockets of metering device 130 that have been emptied. Proppant may be dispensed from a silo 110 through metering device 130 and onto a silo belt 126 of conveyor 125. A conveyor 125 may then transport proppant from one location to another, for example, from a silo 110 to a blender (not shown).

Figure 2:
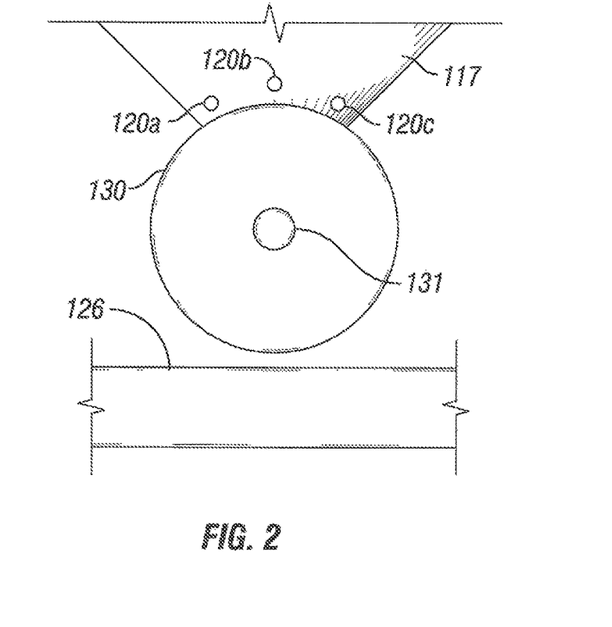
FIG. 2 depicts an expanded view of a metering device, in accordance with aspects of the present disclosure.

FIG. 2 depicts an expanded view of a metering device 130 coupled to a lower cone 117 of the silo 110. As shown in FIG. 2, a silo 110 may comprise one or more sensors 120 for measuring the presence or amount of proppant available in a given silo 110. A sensor 120 may be communicatively coupled to a control unit. In certain embodiments, the one or more sensors 120 may measure the amount of proppant to determine a period of well operations, for example, the production of fracturing fluids, a given silo 110 may be able to support. For example, a certain amount of proppant contained in a silo 110 may correspond to a certain period of well operations in minutes, hours, or days. In certain embodiments, silos 110 may further comprise a display or control panel (not shown) for monitoring the amount of proppant in a given silo 110.

A control unit (not shown) may be used to control proppant flowing into and out of a silo 110. The control unit may be communicatively coupled to any one or more of a silo 110, a filler opening 112, a discharge 113, a sensor 120, a metering device 130, and conveyor 125, or any combination thereof. The control unit may further comprise an interface (not shown) so that a human operator may monitor and control. The control unit may be operated by a human operator or may be automated according to a certain set of rules. In certain embodiments, the control unit may be operable to query the proppant level via one or more sensors of a silo 110.

In certain embodiments, a sensor 120 may be a capacitive proximity sensor 120 to detect the presence or absence of proppant in a silo 110. As would be understood by one of ordinary skill in the art, other types of sensors 120 may be used to detect the presence of proppant in a silo 110, for example, radar, guided wave radar, laser, optical, inductive, level, and mechanical switching sensors. The sensor 120 may detect whether there is sand directly above the metering device 130 at a discharge 113 of the silo 110. A capacitive proximity sensor 120 may measure the capacitive field in front of the sensor to detect objects within a certain distance, for example, 30 mm. As would be understood by one of ordinary skill in the art, other types of sensors 120 may be used to detect the presence or absence of proppant in keeping with aspects of the present disclosure.

In certain embodiments, three sensors 120 may be coupled to a given silo 110 to provide triple modular redundancy. For example, sensors 120*a*, 120*b*, and 120*c* may be coupled to a lower cone 117 of silo 110, as shown in FIG. 2. Triple modular redundancy provides that if at least two sensors 120, for example, sensors 120*a* and 120*b*, of the three sensors 120 associated with a given silo 110 detect proppant in the lower cone 117, then sensors 120 may transmit a signal indicating that there is proppant in the silo 110. Conversely, if at least two sensors 120, for example, sensors 120*b* and 120*c*, of the three sensors 120 associated with a given silo 110 do not detect in the silo, then the sensors 120 may transmit a signal indicating that there is no proppant in the silo 110. Triple modular redundancy may help prevent sensor malfunction and improve the overall reliability of the metering system.

Figure 3:
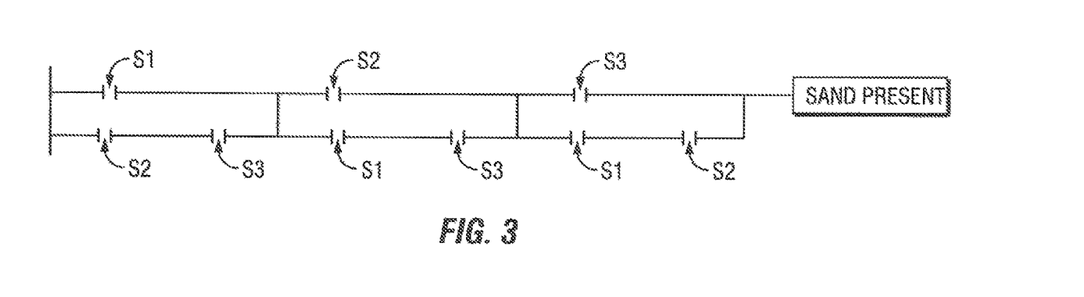
FIG. 3 is a diagram that depicts triple modular redundancy logic for a proppant metering system and method, in accordance with aspects of the present disclosure.

An electrical diagram of triple modular redundancy is shown in FIG. 3. A first switch S1 may be associated with a first sensor 120*a*, a second switch S2 may be associated with a second sensor 120*b*, and a third switch S3 may be associated with a third sensor 120*c*. If a given sensor 120 detects the presence of proppant, the sensor 120, for example first sensor 120*a*, may send a signal to close a switch, for example, first switch S1. Likewise, if second sensor 120*b* detects the presence of proppant, second sensor 120*b* may send a signal to close switch S2, and if third sensor 120*c* detects the presence of proppant, third sensor 120*c* may send a signal to close switch S3. If at least two sensors 120, for example, sensors 120*a* and 120*b*, detect the presence of proppant, then switches S1 and S2 will close, resulting in a signal indicating that sand is present. However, if at least two sensors 120, for example, sensors 120*b* and 120*c*, do not detect the presence of proppant, the switches S2 and S3 will remain open, which will not result in a signal indicating that sand is present.

An encoder 131 may be coupled to a metering device 130, as shown in FIGS. 1 and 2. In certain embodiments, encoder 131 may be a rotary or shaft encoder that converts the converts motion into an electrical signal, e.g., pulses. In certain embodiments, the encoder 131 may be mounted to the shaft (not shown) of the metering device 130. An encoder 131 may be used to track the rotations per time period and the position of the metering device 130. In certain embodiments, an encoder 131 may be an incremental encoder, which generates a number of pulses that may indicate how much the metering device 130 has rotated and at what speed. In other embodiments, an encoder 131 may be an absolute encoder that may also determine the true position of the metering device 130, where each position of the metering device 130 is assigned a unique address. In certain embodiments, other types of sensors may be used as an encoder 131, for example, pulse generators, magnetic pickups, inductive proximity sensors, and a mechanical switch. In certain embodiments, an encoder 131 may generate p number of pulses per revolution of the metering device 130. For example, in certain embodiments, p may be 10, 30, 60, 90, or 120 pulses per revolution. Based on these pulses, a control unit may be able to determine the speed of the metering device 130. Additionally, the control unit may further be able to determine how many pockets of proppant have been discharged based on the number of revolutions of metering device 130. For example, where the encoder generates 60 pulses per revolution, and where a metering device 130 has 12 pockets, the control unit will determine that for every five pulses, one pocket of proppant has been discharged. Thus, control unit can determine the total amount of proppant discharged over a given amount of time.

In order to ensure accurate measurements, metering device 130 may be calibrated for different types of proppant. For example, different types of proppant may have different characteristics such as shape or size (mesh). In certain embodiments, typical proppant sizes may be generally between 8 and 140 mesh. Additionally, the shape of proppant may influence the permeability through a fracture. A larger range of particle sizes and shapes may lead to a more tightly packed arrangement, which may lead to a reduction in permeability or conductivity. A smaller range of sizes and similar shapes, for example, spherical shapes, will lead to an increase in permeability or conductivity. Common types of proppant may include 100 mesh local (originating in-base), 100 mesh Northern (originating from Wisconsin), or combinations such as 40/70 local, etc. In certain embodiments, a metering device 130 may only need to be calibrated once for each type of proppant. A metering device 130 may be required to have the same specifications as other metering devices 130, such that once a metering device 130 is calibrated for a specific type of proppant, other metering devices 130 can be similarly calibrated.

One or more variables of a given type of proppant may affect the amount of proppant that may be discharged by each pocket of metering device 130 at different rotation speeds. One variable is bulk density. For example, the bulk density of a type of a particulate matter may change based on how the particulate matter is handled. Another variable is fluidity of the particulate, which may depend on the particle size and Krumbein roundness and sphericity. These two variables may affect not only the density of a proppant in each pocket of the metering device 130, but also the amount of proppant. In certain embodiments, other variables may likewise affect the density and volume of proppant discharged by a metering device 130. Thus, the calibration process for each type of proppant is particularly important.

The calibration process may comprise running a known amount of proppant through the metering device 130 at different speed intervals. The calibration process may run a predetermined amount by weight or volume of proppant through the metering device 130 at a number of iterations to determine the amount of proppant dispensed by each pocket of the metering device 130 based on the speed of the metering device 130. Based on the total weight $W_T$, the number of pulses per revolution r, the known number of pockets per revolution v, and the number of pulses p measured from the encoder 131, a control unit or operator may be able to determine the weight of proppant dispensed by each pocket $W_P$, according to the below equation (1):

$$W_P = (W_T/p)(r/v) \qquad (1)$$

Pockets of metering device 130 may be filled with various weights depending on the speed of the metering device 130. Running a known amount of proppant through the metering device 130 at various speeds may yield data that can be referenced in a table, for example, table (1) shown below. The data could be used in calculating an amount of proppant per pocket based on the rotations per minute (RPM) of the metering device.

| RPM | Pounds Per Pocket | Pounds Per Pulse |
|---|---|---|
| 0 | 117.16 | 23.432 |
| 1.25 | 117.16 | 23.432 |
| 2.5 | 117.16 | 23.432 |
| 3.75 | 116.88 | 23.376 |
| 5 | 116.56 | 23.312 |
| 6.25 | 116.31 | 23.262 |
| 7.5 | 116.06 | 23.212 |
| 8.75 | 115.50 | 23.100 |
| 10 | 114.94 | 22.988 |
| 11.25 | 114.28 | 22.856 |
| 12.5 | 113.61 | 22.722 |
| 13.75 | 112.89 | 22.578 |
| 15 | 112.17 | 22.434 |
| 16.25 | 111.45 | 22.290 |

By performing a regression analysis of the data, an equation can be formed to relate the speed of the metering device 130 and the amount of proppant per pulse from the encoder 131. An example of an equation relating the speed of the metering device to the amount of proppant is shown below in equation (1), where X is the rotations per minute (RPM) of the metering device 130 and Y is the number of pounds per pulse:

$$Y = 23.44675 - 0.00283X - 0.00430X^2 \qquad (2)$$

This equation could then be used in future iterations of the same proppant type, such that calibration is not required. Each proppant type may be calibrated using the above process to determine an equation similar to equation (2), such that the amount of proppant per pulse based on the speed of the metering device 130 can be estimated. In certain embodiments, if multiple tests are run for a given proppant type at the same speed and consistent results are achieved, it may be determined that the proppant type has consistent bulk density characteristics.

In certain embodiments, a control unit or operator may count the number of pulses emitted by encoder 131 during a set period of time in seconds s, for example, one second. The control unit or operator may then calculate the total weight of proppant discharged $W_D$ by multiplying the number of encoder 131 pulses p by the pound per pocket $W_P$ calculated during the calibration process, as shown below in equation (3).

$$W_D = (p/s) * W_P \qquad (3)$$

In certain embodiments, the control unit 135 may also add an additional amount to the calculated weight of proppant $W_D$ based on the last one or more pulses received from the encoder 131. For example, when the metering device 130 is stopped, the control unit may receive a last one or more pulses from the encoder 131 due to a slight delay from when power is removed from the metering device 130 and when the metering device 130 physically slows to a stop due to inertia. For example, in certain embodiments, the delay may be 1-3 seconds from when the control unit 135 transmits a signal to stop the metering device 130 and when the metering device 130 ceases any movement. The residual weight $W_R$ corresponding to the last one or more pulses received before stopping, may be added to $W_D$ calculated by equation (3) above, as shown below in equation (4).

$$W_D = (p/s) * W_P + W_R \qquad (4)$$

In certain embodiments, it may not be feasible to calibrate the metering device 130 for a particular proppant type before the proppant is needed for a fracturing operation. In these situations, an in-field adjustment of the calibration may be required. The in-field calibration adjustment may comprise emptying a silo 110 of a known proppant type with a weight $W_K$, which would be compared with the result of the metering device 130. The unknown proppant type may then be run and compared to the equation or table of a known proppant type. The variance between the actual weight and calculated weight may be used to create a new equation for the new product type. Based on the difference between the two results, a constant may be multiplied by the equation or table calculated by the calibration process to generate a new equation to be used with new product type. The constant C may be calculated by the following equation (3), where $W_K$ is the weight of the known proppant type and $W_M$ is the weight of the unknown proppant type measured by metering device 130:

$$C = W_K/W_M \qquad (5)$$

As would be understood by one of ordinary skill in the art, the in-field calibration adjustment may result in a higher variance that the standard calibration process, because the equation or table is adjusted by the same constant factor C rather than based on each speed interval. Additionally, in certain embodiments, in-field calibration adjustments may be rare such that the sample size of the results of in-field calibration adjustments is small, resulting in less reliable results. However, the in-field calibration adjustment may be beneficial where pausing or slowing fracturing operations is not possible or desirable. For example, an in-field calibration may be used under certain conditions where there are restraints on time, cost, personnel, or material availability, such that a standard calibration process would not be feasible or beneficial.

Figure 4:
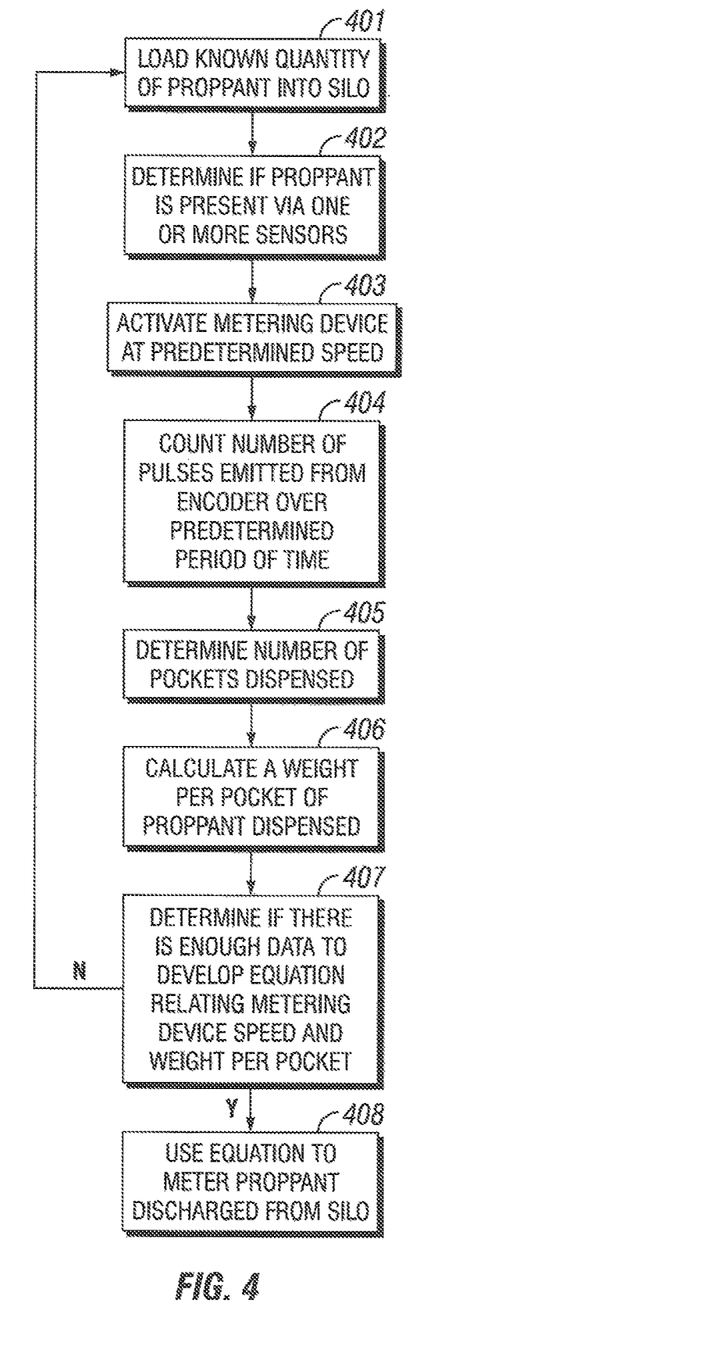
FIG. 4 is a flow diagram that depicts a proppant metering method, in accordance with aspects of the present disclosure.

The method and process for calibrating and metering proppant is described in more detail with respect to FIG. 4. At step 401, a silo 110 may be loaded with a known quantity of proppant, for example, 100,000 to 1 million pounds of proppant. In certain embodiments, the silo 110 may be loaded with a largest quantity associated with the capacity of the silo 110, such that the largest possible sample size is used to achieve more accurate results. At step 402, one or more sensors 120 may be used to determine if proppant is present at a metering device 130. As described above with respect to FIG. 3, in certain embodiments, three sensors 120 may be used to provide triple modular redundancy or "best-of-three" polling. In other embodiments, a single sensor 120 may be used to determine if proppant is present.

After it is determined that proppant is present, at step 403, metering device 130 may be activated and rotated at a predetermined speed in rotations per minute, for example, one of the speeds listed in table (1). The predetermined speed may be input by an operator or may be input by a control unit 135. At step 404, the control unit 135 or operator may count the number of pulses emitted from the encoder 131. Based on the number of pulses p and the known number of pockets n of the metering device 130, the control unit 135 or operator may be able to determine the total number of pockets dispensed while rotating, at step 405. At step 406, the control unit 135 or operator may determine the weight per pocket of proppant $W_P$ dispensed by using equation (1) above.

At step 407, the control unit 135 or operator may determine whether there are enough data points to determine an equation relating the speed of the metering device 135 to the amount of proppant per pocket $W_P$ dispensed. For example, the data may be placed into a table, for example, table (1) above, such that a relationship between the speed of the metering device 135 and the amount of proppant per pocket $W_P$ can be determined. In certain embodiments, three, five, ten, twenty, or fifty data points may be used to determine an equation, for example, equation (2), above. In certain embodiments, multiple iterations of the same proppant type may be run at various speeds to achieve more accurate results. For example, a given proppant type may be calibrated at ten different speeds for five iterations, amounting to fifty total tests or data points. Forming an equation based on a sufficient number of data points may be associated with a proppant type being sufficiently calibrated. If it is determined that there are not enough data points to formulate an equation such that a given proppant type is sufficiently calibrated, the process may return to step 401 and run the process again at another predetermined speed. If the given proppant type is sufficiently calibrated, the process may proceed to step 408, and the formulated equation may be used to accurately meter the specific proppant type, without need for further calibration.

Thus, the present disclosure provides an improved method and system for measuring proppant discharged from a storage container. The improved process may increase efficiency over prior metering systems by allowing the silo-loading process to occur simultaneously with the discharge of proppant from the silo, while maintaining accurate measurements. Additionally, the present disclosure provides for a metering system that may be operable to measure all different types of proppant, accounting for variables such as bulk density and particle size, while only needing to be calibrated once for each proppant type. As a result, less system downtime may be required, increasing the overall efficiency of fracturing operations.

What is claimed is:

1. A method comprising:
loading a known amount of a first proppant type into a storage container;
detecting proppant at or adjacent to a discharge outlet of the storage container via one or more sensors coupled to the storage container;
operating a metering device at a predetermined speed, wherein the metering device is coupled to the discharge outlet of the storage container, and wherein the metering device comprises one or more pockets for receiving the first proppant type;
dispensing a known amount of the first proppant type from the storage container via the metering device, wherein an encoder coupled to the metering device emits pulses during the dispensing;
determining an amount of the first proppant type dispensed by at least one pocket of the one or more pockets of the metering device based at least in part on the pulses; and
determining a relationship between the known amount of the first proppant type dispensed by each pocket and a speed of the metering device.

2. The method of claim 1, wherein the one or more sensors comprise three sensors that are configured to provide triple modular redundancy.

3. The method of claim 1, wherein the one or more sensors are capacitive proximity sensors.

4. The method of claim 1, wherein the metering device comprises at least 12 pockets for receiving the first proppant type.

5. The method of claim 1, wherein the encoder emits 60 pulses per rotation of the metering device.

6. The method of claim 1, further comprising:
determining a relationship between a second proppant type the speed of the metering device based, at least in part, on the relationship between the amount of the first proppant type dispensed by each pocket and the speed of the metering device.

7. The method of claim 1, wherein the relationship between the amount of the first proppant type dispensed by each pocket and the speed of the metering device is determined using a linear regression analysis.

* * * * *